United States Patent
Morishima et al.

(10) Patent No.: US 10,989,882 B2
(45) Date of Patent: Apr. 27, 2021

(54) OPTICAL CONNECTOR

(71) Applicant: SUMITOMO ELECTRIC INDUSTRIES, LTD., Osaka (JP)

(72) Inventors: Tetsu Morishima, Yokohama (JP); Jun Ito, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/569,954

(22) Filed: Sep. 13, 2019

(65) Prior Publication Data

US 2020/0003964 A1    Jan. 2, 2020

Related U.S. Application Data

(63) Continuation of application No. PCT/JP2018/006526, filed on Feb. 22, 2018.

(30) Foreign Application Priority Data

Mar. 17, 2017  (JP) .............................. JP2017-053413

(51) Int. Cl.
  *G02B 6/38*   (2006.01)
  *G02B 6/02*   (2006.01)
  *G02B 6/40*   (2006.01)

(52) U.S. Cl.
  CPC ......... *G02B 6/3885* (2013.01); *G02B 6/3882* (2013.01); *G02B 6/02042* (2013.01); *G02B 6/3863* (2013.01); *G02B 6/403* (2013.01)

(58) Field of Classification Search
  None
  See application file for complete search history.

(56) References Cited

FOREIGN PATENT DOCUMENTS

| JP | 2002-341188 A | * | 11/2002 |
| JP | 2003-57495 A | * | 2/2003 |
| JP | 2004-219567 A | | 8/2004 |
| JP | 2015-152692 A | | 8/2015 |
| WO | WO-2015/064635 A1 | | 5/2015 |

OTHER PUBLICATIONS

English translation of written opinion for PCT/JP2018/006526, dated May 22, 2018. (Year: 2018).*
Kengo Watanabe et al., "MPO Type 8-Multicore Fiber Connector With Physical Contact Connection," Journal of Lightwave Technology, Jan. 15, 2016, pp. 351-357, vol. 34, No. 2.

* cited by examiner

*Primary Examiner* — Michael Stahl
(74) *Attorney, Agent, or Firm* — Faegre Drinker Biddle & Reath LLP

(57) ABSTRACT

The present embodiment relates to an optical connector capable of reducing a pressing force applied to each of a plurality of optical fibers simultaneously held by a ferrule and effectively reducing fiber damage. The optical connector includes a ferrule including a plurality of through holes and a plurality of optical fibers held by the ferrule with end faces of the optical fibers protruding from the ferrule. The maximum curvature of the end face of each of the optical fibers and a variation amount of a protrusion amount of each of the optical fibers are adjusted to enable excellent many-to-many PC connection.

5 Claims, 10 Drawing Sheets

*Fig.2*

| TYPE | CONNECTOR STRUCTURE |
|---|---|
| C | |
| D | |

OPTICAL CONNECTOR

CROSS-REFERENCE TO RELATED APPLICATIONS

This application is a continuation application of PCT/JP2018/006526 claiming the benefit of priority of the Japanese Patent Application No. 2017-053413 filed on Mar. 17, 2017, the entire contents of which are incorporated herein by reference.

TECHNICAL FIELD

The present invention relates to an optical connector.

BACKGROUND ART

MPO (Multi-fiber Push On) connector standards of IEC define, for an MT (Mechanically Transferable) ferrule that holds twelve single-core optical fibers (hereinbelow, referred to as "SCFs"), that a protrusion amount of each of the optical fibers from the MT ferrule is 1 µm to 3.5 µm, a variation of the protrusion amount of each of the twelve optical fibers (the difference between the maximum protrusion amount and the minimum protrusion amount) is 0.3 µm or less, and a curvature radius of an end face of each of the optical fibers (hereinbelow, referred to as the "fiber end face") is 1 mm or more.

Typically, in an MPO connector that optically connects a pair of MT ferrules each of which holds a plurality of optical fibers, in order to PC (Physical Contact)-connect optical fibers whose fiber end faces are opposed to each other (cores each located on the center of a cladding) with a low pressing force, the tip part of each optical fiber held by the MT ferrule (hereinbelow, referred to as the "fiber tip part") is protruded from the MT ferrule so that the cores easily make contact with each other.

On the other hand, Non-Patent Document 1 discloses an MPO connector that butts MT ferrules, each of which holds a plurality of multicore optical fibers (hereinbelow, referred to as "MCFs"), against each other to simultaneously PC-connect the MCFs located on one side and the MCFs located on the other side (referred to as "many-to-many PC connection").

Generally, an MCF also includes cores present at a position other than the central part of the fiber. Thus, in order to PC-connect two MCFs which are opposed to each other, it is necessary to bring the MCFs into surface contact with each other in a wider area than that in a typical SCF. Thus, in PC connection between MCFs, it is necessary to elastically deform a wide area of each fiber end face. Accordingly, a pressing force applied to the fiber end face of each of the two opposed MCFs is likely to increase as compared to a typical SCF. In Non-Patent Document 1, the fiber tip part is not fixed to a hole of the MT ferrule, and the protrusion amount of the MCF from the front end face of the MT ferrule is set at 4 µm or more, which is larger than a typical protrusion amount. Further, the center-to-center distance between a central core which is disposed on the central axis of the MCF and peripheral cores which are disposed surrounding the central axis is set at 50 µm.

CITATION LIST

Non Patent Literature

Non-Patent Document 1: Kengo Watanabe, et al., "MPO Type 8-Multicore Fiber Connector With Physical Contact Connection", JOURNAL OF LIGHTWAVE TECHNOLOGY, VOL. 34, NO. 2, Jan. 15, 2016

SUMMARY OF INVENTION

Technical Problem

The inventors have made studies of conventional optical connectors and found problems as described below. Specifically, in PC connection between two MCFs which are opposed to each other, peripheral cores other than central cores in the respective MCFs may not be PC-connected to each other when a high pressing force is not applied to the fiber end faces of the two MCFs. Thus, in order to satisfactorily PC-connect the peripheral cores of the respective MCFs, it is necessary to elastically deform the fiber end face of each of the MCFs over a wide area (a high pressing force is required).

Further, the MPO connector of Non-Patent Document 1 described above has a reliability problem in that, for example, the MCF protruding from the front end face of the MT ferrule (the fiber tip part) becomes chipped. Specifically, the MCFs, which are inserted in the respective holes formed on the MT ferrule for holding the MCFs, are not bonded to the holes. Further, the protrusion amount of each MCF is set at a large value. In such an MPO connector, there is a possibility that the MCFs become cracked or chipped in PC connection between the opposed MCFs or cleaning of the fiber end faces (there is a possibility that the MCFs become unusable). Further, a flaw is apt to be produced in the fiber end faces, and there is also a possibility of deterioration of the MCF reflection characteristic.

Further, in the MPO connector of Non-Patent Document 1 described above, there is also a problem in that it is difficult to control the protrusion amount of the MCF from the front end face of the MT ferrule. When a variation of the protrusion amount of each of the MCFs is large, there may be an MCF that is not PC-connected.

The present invention has been made to solve the problems as described above, and an object thereof is to provide an optical connector provided with a structure that reduces a pressing force applied to each of a plurality of optical fibers simultaneously held by a ferrule and reduces the possibility of damage of the optical fibers.

Solution to Problem

An optical connector according to the present embodiment is provided with a structure for safely and easily enabling PC connection between optical fibers integrated with ferrules. Specifically, one aspect of the optical connector according to the present embodiment includes a plurality of first optical fibers and a first ferrule. The first ferrule includes one end face (front end face) and a plurality of through holes (hereinbelow, referred to as the "ferrule holes") each having an opening on the front end face. The first optical fibers are held by the respective ferrule holes with fiber end faces protruding therefrom. In particular, each fiber tip part is held by the first ferrule so as to satisfy the following formula (1).

$$(\Delta h/3.5)^2 + (R/0.2)^2 < 1 \tag{1}$$

In formula (1), $\Delta h$ [µm] is a variation amount of a protrusion amount h [µm] of each of the optical fibers from the front end face of the first ferrule to each fiber end face while one opening of each of the ferrule holes is disposed on the front end face of the first ferrule, the protrusion amount h [μm] is defined along a central axis of each of the optical fibers, and R is a maximum curvature [1/mm] of each fiber end face.

Advantageous Effects of Invention

According to the optical connector according to the present invention, the curvature R of the fiber end faces of the optical fibers simultaneously held by the ferrule is set small (the flatness of the fiber end faces is increased). Thus, it is possible to reduce a pressing force applied to each of the optical fibers. Further, since a variation of the protrusion amount of each of the optical fibers from the front end face of the ferrule is small, it is possible to reduce the possibility of damage of the optical fibers.

BRIEF DESCRIPTION OF DRAWINGS

FIG. 2 is a diagram illustrating the sectional structure of an SC (Single Coupling) type connector 2 and an SC ferrule as the optical connector according to the present embodiment.

DESCRIPTION OF EMBODIMENTS

Figure 1:
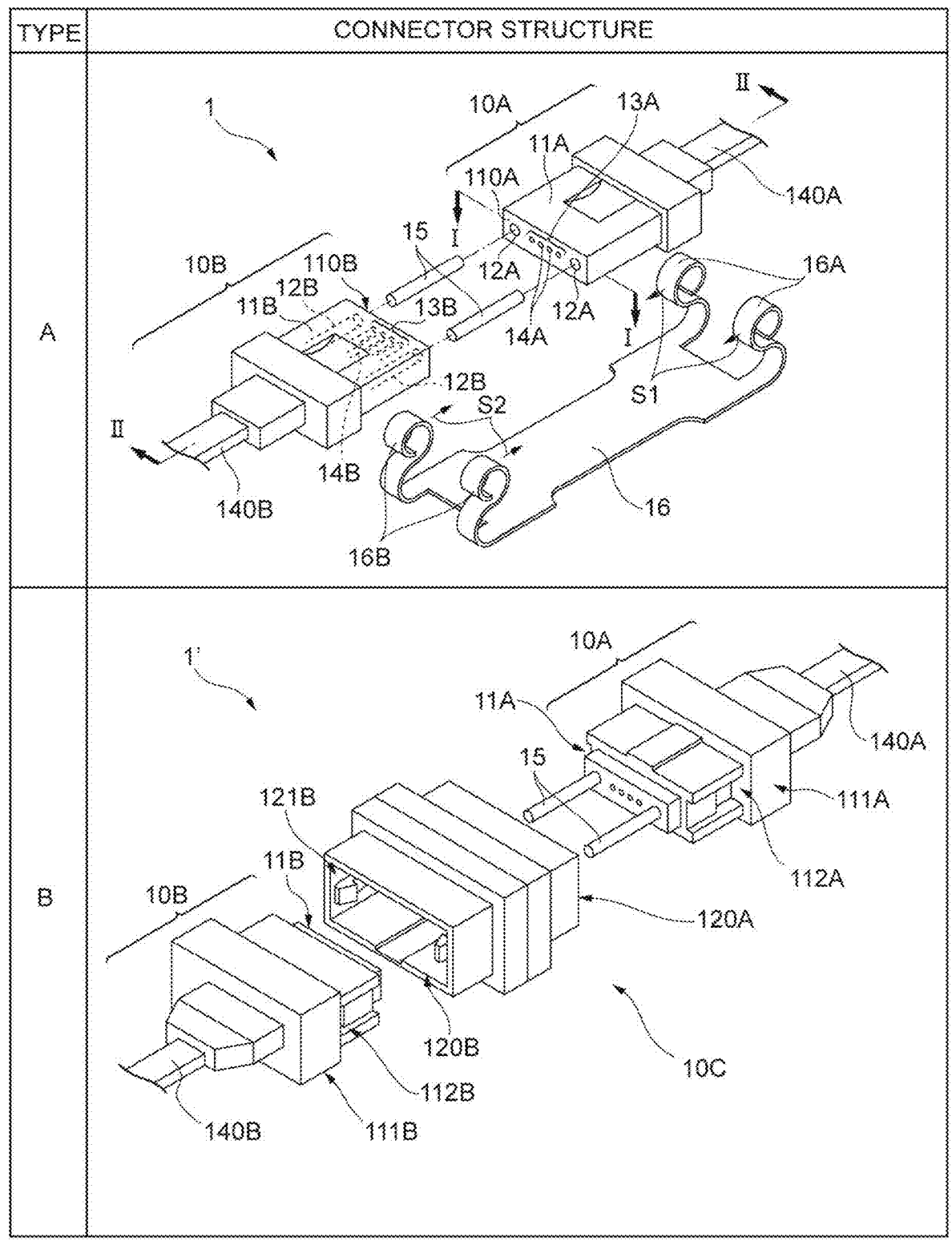
FIG. 1 is a diagram illustrating the structure of an MT connector 1 and an MPO connector 1' as an optical connector according to the present embodiment.

Description of Embodiment of the Present Invention

First, details of an embodiment of the present invention will be individually listed and described.

(1) As one aspect, an optical connector according to the present embodiment includes a plurality of first optical fibers and a first ferrule. The first ferrule includes one end face (front end face) and a plurality of ferrule holes each having an opening on the front end face. In particular, each fiber tip part is held by the first ferrule so as to satisfy the following formula (2).

$$(\Delta h/3.5)^2 + (R/0.2)^2 < 1 \qquad (2)$$

In formula (1), Δh [μm] is a variation amount of a protrusion amount h [μm] of each of the optical fibers from the front end face of the first ferrule to each fiber end face while one opening of each of the ferrule holes is disposed on the front end face of the first ferrule, the protrusion amount h [μm] is defined along a central axis of each of the optical fibers, and R is a maximum curvature [1/mm] of each fiber end face.

(2) The optical connector according to the present embodiment is provided with a structure for safely and easily enabling PC connection between optical fibers integrated with ferrules. Thus, as one aspect of the present embodiment, in the optical connector, a side face of the tip part of each of the first optical fibers and an inner wall surface of a corresponding one of the ferrule holes of the first ferrule are bonded and fixed to each other before PC connection.

(3) As one aspect of the present embodiment, in the structure as described above, a curvature radius r (=1/R) of the fiber end face is set at 25 mm or more, preferably 60 mm or more, and more preferably 100 mm or more. Further, a maximum value of the protrusion amount h is defined by a positive value of 3.5 μm or less, preferably 1.0 μm or less, and more preferably 0.5 μm or less. In the present specification, the "protrusion amount" is defined by a central axis length of the optical fiber between the front end face of the ferrule and the fiber end face protruding from the front end face. The "central axis length of the optical fiber" indicates the length of an axis passing through the center of a cross section of the optical fiber, the cross section being perpendicular to the longitudinal direction of the optical fiber. Typically, in the case of an MT (Mechanically Transferable) ferrule that holds twelve optical fibers, the curvature radius r of the fiber end face is 3 mm to 10 mm. On the other hand, in the present embodiment, the fiber end face is more flattened. Further, in the MT ferrule standards, the protrusion amount h is 1 μm to 3.5 μm. In the case of many-to-many PC connection between optical fibers, there is a trade-off relationship between the variation amount Δh of the protrusion amount h and the curvature R (or the curvature radius r).

(4) As disclosed in Non-Patent Document 1 described above, when the end faces of the optical fibers are protruded and polished, the fiber end faces are butted against each other over a wider area using elastic deformation of the optical fiber end faces (PC connection), which requires a larger pressing force. However, since the fiber tip part is not fixed to the ferrule hole, as the fiber tip part which is not protected by the ferrule becomes longer, there are higher possibilities that the optical fiber is damaged (a glass part becomes cracked or chipped) during an operation of PC connection or cleaning of the fiber end face and deterioration of the reflection characteristic is caused by a flaw produced on the fiber end face. In addition, a variation of the protrusion amount of each of optical fibers is large. Thus, there is not only a possibility that the pressing force applied to the fiber end faces largely varies, but also a possibility that there is an optical fiber that cannot be PC connected. On the other hand, in the present embodiment, since the variation amount Δh of the protrusion amount h and the maximum curvature R satisfy the above formula (2), even when there is a variation of the protrusion amount h of each of the optical fibers, excellent PC connection between the optical fibers can be maintained for any of the optical fibers simultaneously held by the MT ferrule.

(5) As one aspect of the present embodiment, each of the first optical fibers is preferably an MCF (multicore optical fiber). The MCF includes a plurality of cores and a single cladding surrounding each of the cores. In particular, in the case of the MCF including a plurality of cores, in order to achieve PC connection between two MCFs whose fiber end faces are opposed to each other, flattening of the fiber end faces is more effective. Further, in a cross section of the MCF, the cross section being perpendicular to a longitudinal direction of the MCF, the cores are disposed surrounding a center of the cross section in a state in which a shortest distance from the center of the cross section to a center of each of the cores is 5 µm or more. In this manner, flattening of the fiber end faces is more effective in PC connection between MCFs each of which includes cores located at a position away from the center of the cladding (which coincides with the cross-section center of the MCF) by a core eccentric amount or more.

(6) As one aspect of the present embodiment, the variation amount Δh of the protrusion amount h of each of the first optical fibers is 0.1 µm or less, and preferably 0.05 µm or less. In this case, the pressing forces applied to the respective optical fiber are equalized.

(7) As one aspect of the present embodiment, in order to enable ferrules to butt against each other, the first ferrule may include a pair of guide holes disposed with the ferrule holes interposed therebetween. In this case, the optical connector may include a plurality of first optical fibers, a first ferrule holding the first optical fibers, the first ferrule having the structure as described above, a plurality of second optical fibers, a second ferrule holding the second optical fibers, a pair of guide pins, and a press applying structure for achieving many-to-many PC connection between the first optical fibers held by the first ferrule and the respective second optical fibers held by the second ferrule. Each of the second optical fibers which is PC-connected to any of the first optical fibers has the same structure as the first optical fiber. The second ferrule also has the same structure as the first ferrule. Each of the guide pins has one end inserted into the corresponding guide hole of the first ferrule and the other end inserted into the corresponding guide hole of the second ferrule. The press applying structure butts the end faces of the first optical fibers and the end faces of the respective second optical fibers against each other while applying a pressing force of 10 N or more, and preferably 20 N or more with the first ferrule and the second ferrule opposed to each other through the pair of guide pins. The present embodiment applies desired elastic deformation to each of the end faces of the first optical fibers and the second optical fibers by such a pressing force to enable PC connection between the fiber end faces between the corresponding first and second optical fibers.

(8) As one aspect of the present embodiment, the optical connector may be provided with an SC structure that enables PC connection between single optical fibers using deformation of the ferrule itself by a press. In this case, the optical connector having the SC structure includes a single first optical fiber, and a first ferrule comprised of zirconia, the first ferrule including one end face (front end face) and a single ferrule hole having an opening on the one end face. The ferrule hole of the first ferrule holds a fiber tip part (including a fiber end face) of the first optical fiber with the tip part inserted through the ferrule hole. In particular, a curvature radius r (=1/R) of the fiber end face defined by a maximum curvature R of the fiber end face is set at 10 mm or more, and preferably 25 mm or more so as to satisfy the standard of a ferrule that holds a typical single optical fiber (10 mm to 25 mm). A retraction amount d defined along a central axis of the optical fiber from the front end face of the first ferrule where one opening of the ferrule hole is disposed to the end face of the first optical fiber is set at −0.05 µm or more and +0.1 µm or less (recommended standard: JIS5965-3-2, IEC 61755-3-2). In the present specification, the "retraction amount" is defined by a central axis length of the optical fiber between the front end face of the ferrule and the fiber end face retracted from the front end face. When the retraction amount falls within a positive value range, the retraction amount indicates that the fiber end face is located inside the ferrule hole. Further, when the retraction amount falls within a negative value range, the retraction amount indicates that the fiber end face is located outside the ferrule (the fiber end face protrudes from the front end face).

(9) As one aspect of the present embodiment, the optical connector having the SC structure may include a single first optical fiber, a first ferrule holding the first optical fiber, the first ferrule having the structure as described above, a single second optical fiber, a second ferrule holding the second optical fiber, a guide structure for opposing the first ferrule and the second ferrule to each other, and a press applying structure for butting the first and second ferrules against each other to enable one-to-one PC connection between the first optical fiber and the second optical fiber. The second optical fiber which is PC-connected to the first optical fiber has the same structure as the first optical fiber. The second ferrule also has the same structure as the first ferrule. The press applying structure butts the front end face of the first ferrule and the front end face of the second ferrule against each other while applying a pressing force of 5 N or more, preferably 10 N or more, and more preferably 20 N or more. In the present embodiment, the first and second ferrules are deformed by such a pressing force to enable PC connection between the fiber end face of the first optical fiber and the fiber end face of the second optical fiber. Further, the optical connector having the SC structure as described above may further include a guide structure for opposing the first and second ferrules to each other.

Each of the aspects listed in the [Description of Embodiment of the Present Invention] is applicable to all the other aspects or all combinations of the other aspects.

Details of Embodiment of the Present Invention

Hereinbelow, a concrete example of the optical connector according to the present invention will be described with reference to the accompanying drawings. Note that the present invention is not limited to these examples, and it is intended that the present invention is defined by the claims and includes all changes within the meaning and range equivalent to the claims. In the following description, identical parts and identical elements are designated by the same reference signs to omit redundant description.

Figure 2:
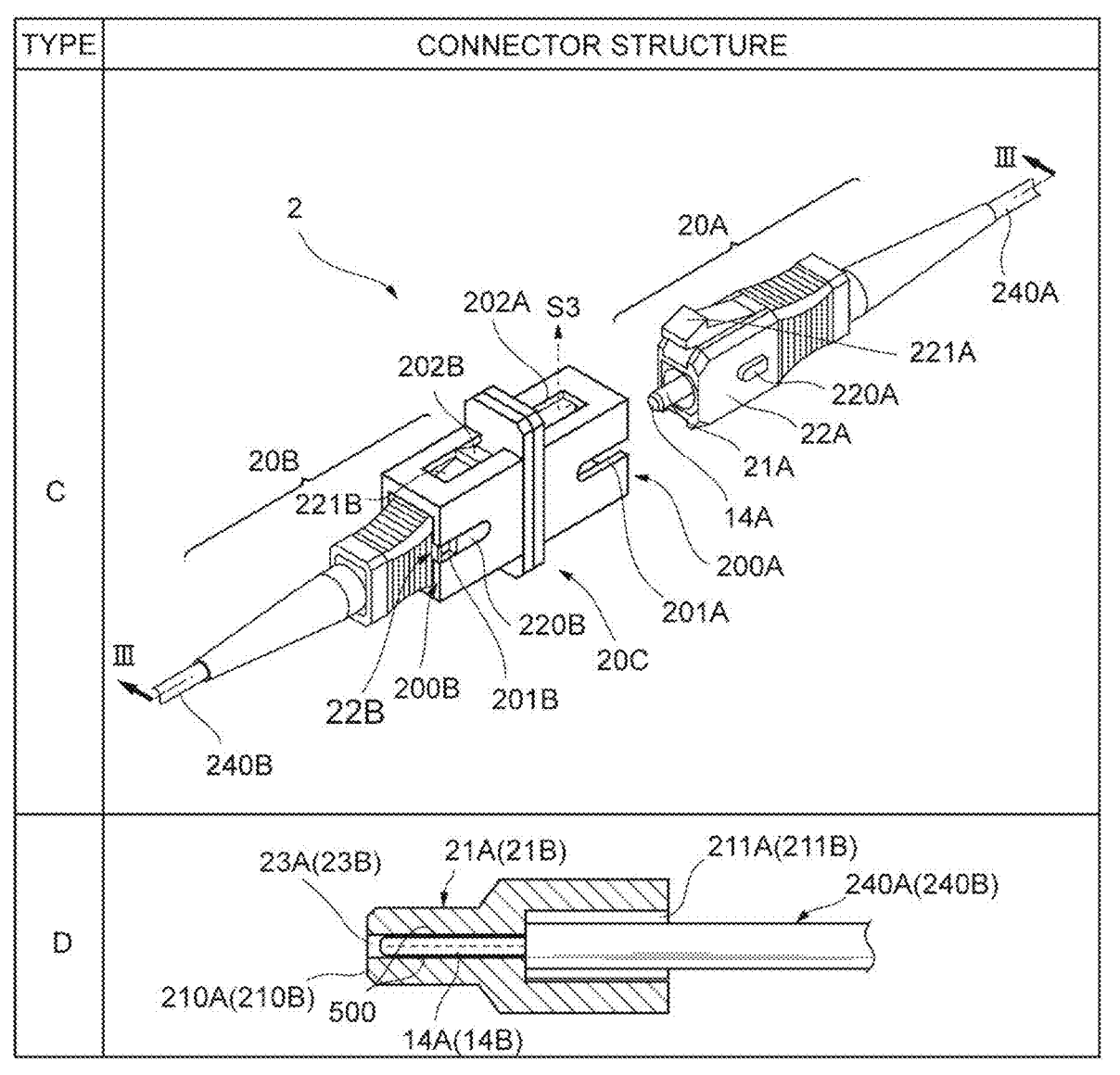

FIG. 1 is a diagram illustrating the structure of an MT connector 1 and an MPO connector 1' as the optical connector according to the present embodiment. FIG. 2 is a diagram illustrating the sectional structure of an SC type connector 2 and an SC ferrule applicable to the SC type connector 2 as the optical connector according to the present embodiment. A type A and a type B illustrated in FIG. 1 are both optical connectors that simultaneously achieve PC connection between optical fibers to enable many-to-many optical connection. The type A illustrates an example of the MT connector 1, and the type B illustrates an example of the MPO connector 1'. Further, the optical connector of a type C illustrated in FIG. 2 is an example of the SC type connector 2 which enables one-to-one optical connection by PC connection between optical fibers. A type D is an example of the sectional structure (the sectional structure taken along line III-III) of the SC ferrule which is applied to the SC type connector 2 of the type C described above.

The MT connector 1 of the type A illustrated in FIG. 1 includes a plug 10A which includes an MT ferrule 11A, a plug 10B which includes an MT ferrule 11B, and a clip 16 as a press applying structure which applies a press to each of the plugs 10A, 10B mounted on the clip 16. The plugs 10A, 10B which abut on each other through a pair of guide pins 15 are mounted on the clip 16. The clip 16 is provided with a support piece 16A which applies a press to the plug 10A in a direction indicated by arrow S1 in the drawing and a support piece 16B which applies a press to the plug 10B in a direction indicated by arrow S2 in the drawing. When the plugs 10A and the plug 10B which abut on each other are mounted on the clip 16, optical fibers 14A and optical fibers 14B are PC-connected to each other, and many-to-many optical connection is achieved.

The plug 10A includes the MT ferrule 11A and a plurality of optical fibers 14A which are bundled together inside an optical cable 140A (may be a tape fiber). The optical cable 140A is attached to the MT ferrule 11A through a boot. The MT ferrule 11A includes a plurality of ferrule holes 13A each of which holds the tip part of the corresponding optical fiber 14A (including a fiber end face 141A described later) inserted through the ferrule hole 13A, and the fiber end face 141A of the optical fiber 14A protrudes from a front end face 110A of the MT ferrule 11A. Further, the MT ferrule 11A includes guide holes 12A which are formed on the front end face 110A with the ferrule holes 13A interposed therebetween, and one end of each of the guide pins 15 is inserted into the corresponding guide hole 12A.

The plug 10B has the same structure as the plug 10A described above. Specifically, the plug 10B includes the MT ferrule 11B and a plurality of optical fibers 14B which are bundled together inside an optical cable 140B. The optical cable 140B is attached to the MT ferrule 11B through a boot. The MT ferrule 11B includes a plurality of ferrule holes 13B each of which holds the tip part of the corresponding optical fiber 14B (including a fiber end face 141B described later) inserted through the ferrule hole 13B, and the fiber end face 141B of the optical fiber 14B protrudes from a front end face 110B of the MT ferrule 11B. Further, the MT ferrule 11B includes guide holes 12B which are formed on the front end face 110B with the ferrule holes 13B interposed therebetween, and the other end of each of the guide pins 15 is inserted into the corresponding guide hole 12B.

The MPO connector 1' of the type B illustrated in FIG. 1 also includes a plug 10A which includes an MT ferrule 11A and a plug 10B which includes an MT ferrule 11B as with the MT connector 1 described above. However, the MPO connector 1' differs from the MT connector 1 of the type A in that the MPO connector 1' further includes an adapter 10C which holds the plug 10A and the plug 10B while applying a pressing force to the MT ferrules 11A, 11B which are opposed to each other through a pair of guide pins 15. Further, the plug 10A and the plug 10B of the type B include housings 111A, 111B in which the MT ferrules 11A, 11B are housed, respectively, as a structure different from the MT connector 1 of the type A. The housing 111A includes a pair of engagement grooves 112A which constitutes a part of the press applying structure, and the housing 111B includes a pair of engagement grooves 112B which constitutes a part of the press applying structure. On the other hand, the adapter 10C includes an opening 120A which holds the plug 10A in which the MT ferrule 11A is housed with the tip part of the plug 10A inserted in the opening 120A and an opening 120B which holds the plug 10B in which the MT ferrule 11B is housed with the tip part of the plug 10B inserted in the opening 120B. A pair of engagement pins 121B, which is fitted with the pair of engagement grooves 112B of the plug 10B, is disposed inside the opening 120B. Similarly, a pair of engagement pins having the same structure as the pair of engagement pins 121B is disposed inside the opening 120A. The other structure except the above structure is similar to the MT connector 1 of the type A.

The SC type connector 2 of the type C illustrated in FIG. 2 includes a plug 20A which includes an SC ferrule 21A housed inside a housing, a plug 20B which includes an SC ferrule 21B housed inside a housing, and an adapter 20C which holds the plugs 20A, 20B opposed to each other. The adapter 20C includes an opening 200A in which the plug 20A is housed and an opening 200B in which the plug 20B is housed. Further, the adapter 20C includes an engagement port 202A which constitutes a part of a press applying structure for applying a press to the plug 20A, a guide groove 201A for guiding the plug 20A to a predetermined position inside the opening 200A, an engagement port 202B which constitutes a part of a press applying structure for applying a press to the plug 20B, and a guide groove 201B for guiding the plug 20B to a predetermined position inside the opening 200B. When the plugs 20A, 20B are inserted into the adapter 20C, an optical fiber 14A and an optical fiber 14B are PC-connected to each other, and one-to-one optical connection is thereby achieved.

The plug 20A includes the SC ferrule 21A and the optical fiber 14A which is included in an optical cable 240A, and the tip parts of the SC ferrule 21A and the optical fiber 14A are housed inside a housing 22A. The housing 22A includes an engagement pin 221A which constitutes a part of the press applying structure for applying a press to the plug 20A together with the engagement port 202A of the adapter 20C and a guide piece 220A for guiding the plug 20A to the predetermined position inside the opening 200A together with the guide groove 201A of the adapter 20C. The engagement pin 221A is engaged with the engagement port 202A by moving in a direction indicated by arrow S3 in the drawing.

The plug 20B has the same structure as the plug 20A described above. Specifically, the plug 20B includes the SC ferrule 21B and the optical fiber 14B which is included in an optical cable 240B, and the tip parts of the SC ferrule 21B and the optical fiber 14B are housed inside a housing 22B. The housing 22B includes an engagement pin 221B which constitutes a part of the press applying structure for applying a press to the plug 20B together with the engagement port 202B of the adapter 20C and a guide piece 220B for guiding the plug 20B to the predetermined position inside the opening 200B together with the guide groove 201B of the adapter 20C.

The type D illustrated in FIG. 2 is a cross section of the SC ferrule 21A (21B) which is applied to the SC type connector 2 of the type C. One of the ferrules, that is, the SC ferrule 21A includes a fiber insertion hole 211A and a ferrule hole 23A. The side face of the tip part of the optical fiber 14A inserted inside the ferrule hole 23A is bonded and fixed to an inner wall surface of the ferrule hole 23A with an adhesive 500 such as an epoxy resin. In the case of the SC ferrule 21A, the fiber end face 141A of the optical fiber 14A is preferably located at a position that does not protrude from the front end face 210A of the SC ferrule 21A (specifically, inside the ferrule hole 23A). Although the other SC ferrule is not illustrated, since the other SC ferrule has the same structure as the SC ferrule 21A, sign "B" is affixed to the reference sign of each part of the SC ferrule 21A for reference.

Figure 3:
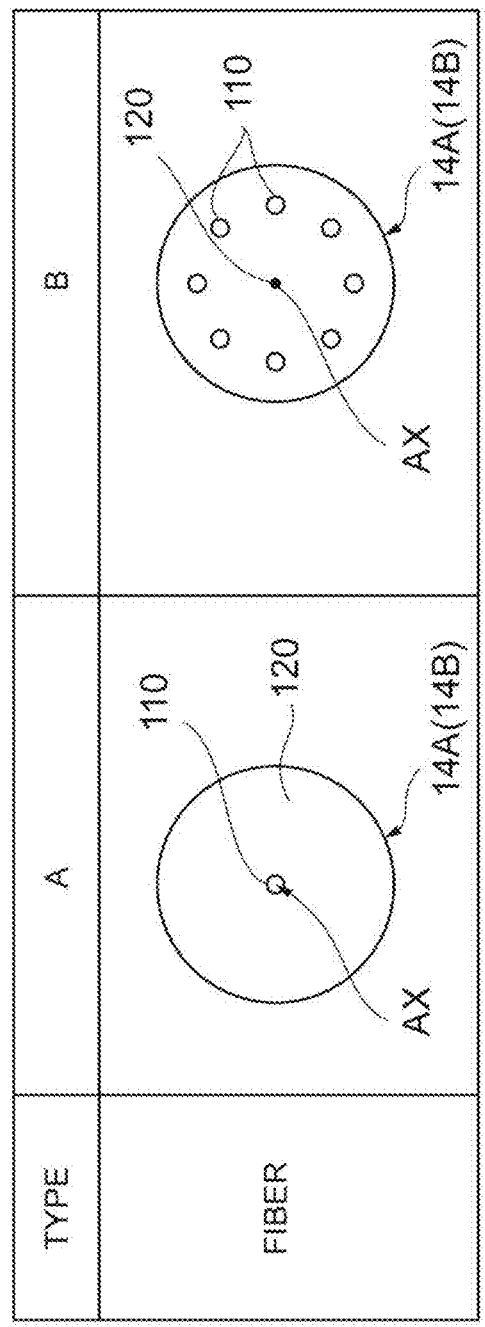
FIG. 3 is a diagram illustrating the sectional structure of each of an SCF and an MCF.

For example, as illustrated in FIG. 3, the SCF of the type A and the MCF of the type B are both applicable to the optical fiber 14A and the optical fiber 14B which are applied to the MT connector 1 of the type A, the MPO connector 1' of the type B, and the SC type connector 2 of the type C. In FIG. 3, AX denotes the central axis of each of the optical fibers 14A, 14B. Further, the central axis AX indicates an axis passing through the center of a cross section perpendicular to the longitudinal direction of each of the optical fibers 14A, 14B.

Specifically, the SCF of the type A includes a single core 110 which extends along the central axis AX and a single cladding 120 which surrounds the core 110. On the other hand, the MCF of the type B includes, in a cross section of the MCF, a plurality of cores 110 which are not located on the central axis AX, but disposed surrounding the central axis AX, and a single cladding 120 which surrounds the cores. In the MCF of the type B, the cores 110 are disposed surrounding a cross-section center (which coincides with the central axis AX) in a state in which the shortest distance from the cross-section center to the center of each of the cores 110 is 5 μm or more.

First Embodiment

Figure 4:
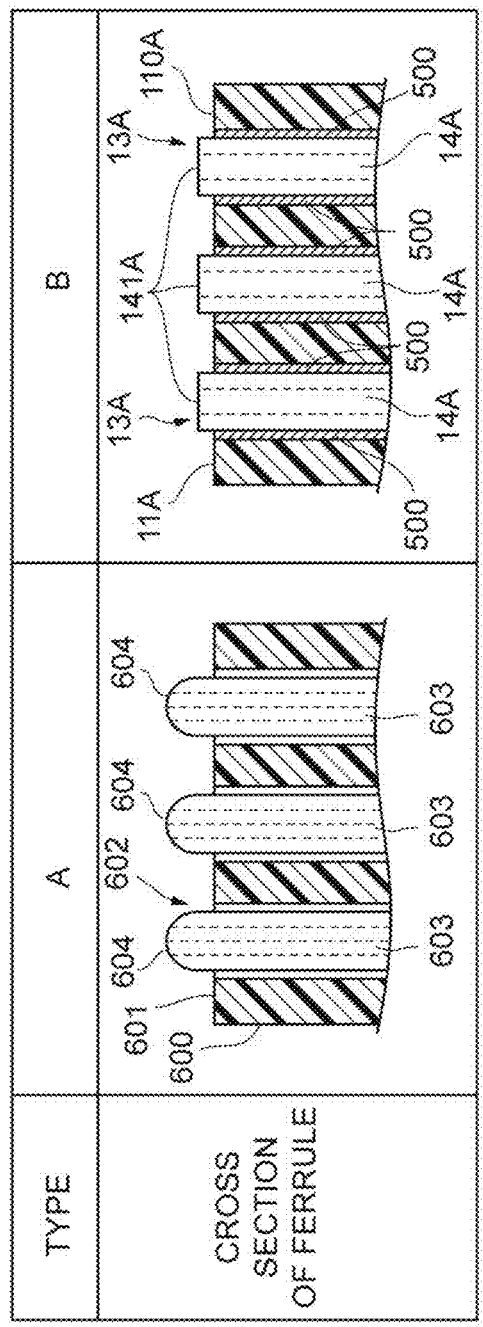
FIG. 4 is a sectional view of an MT ferrule for describing a protrusion state of an MCF in a first embodiment and a comparative example.

A first embodiment relates to the MT connector 1 of the type A and the MPO connector 1' of the type B in FIG. 1. FIG. 4 illustrates the sectional structure of an MT ferrule 600 illustrated in Non-Patent Document 1 described above (type A) and the sectional structure of the MT ferrule 11A which is applicable to the MT connector 1 and the MPO connector 1' of the present embodiment (type B). The sectional structure of FIG. 4 corresponds to a cross section along line I-I in the type A of FIG. 1. Further, only the MT ferrule 11A is illustrated in the type B of FIG. 4, and the sectional structure of the MT ferrule 11B is omitted because the MT ferrule 11B has the same structure as the MT ferrule 11A.

Specifically, the MT ferrule 600 of the type A includes a plurality of ferrule holes 602 into which a plurality of optical fibers 603 whose fiber end faces 604 are protruded and polished are inserted. In the MT ferrule 600 of the type A, each of the fiber end faces 604 of the optical fibers 603 protrudes from a front end face 601 of the MT ferrule 600 by 4 μm or more. Further, the side face of the optical fiber 603 is not fixed to the inner wall surface of the ferrule hole 602.

On the other hand, similarly, the MT ferrule 11A of the type B includes a plurality of ferrule holes 13A into which a plurality of optical fibers 14A whose fiber end faces 141A are set at a predetermined curvature R are inserted. In the MT ferrule 11A of the type B, each of the fiber end faces 141A of the optical fibers 14A protrudes from the front end face 110A of the MT ferrule 11A by a predetermined distance (protrusion amount h). Further, differently from the MT ferrule 600 of the type A described above, the side face of the optical fiber 14A is previously bonded and fixed to the inner wall surface of the ferrule hole 13A with the adhesive 500 before PC connection. In particular, in the present embodiment, since the optical fibers 14A are fixed to the MT ferrule 11A before PC connection, a variation of the protrusion amount h of each of the optical fibers 14A is preferably 0.1 μm or less so that a pressing force can be substantially uniformly applied to each of the fiber end faces 141A of the optical fibers 14A.

Figure 5:
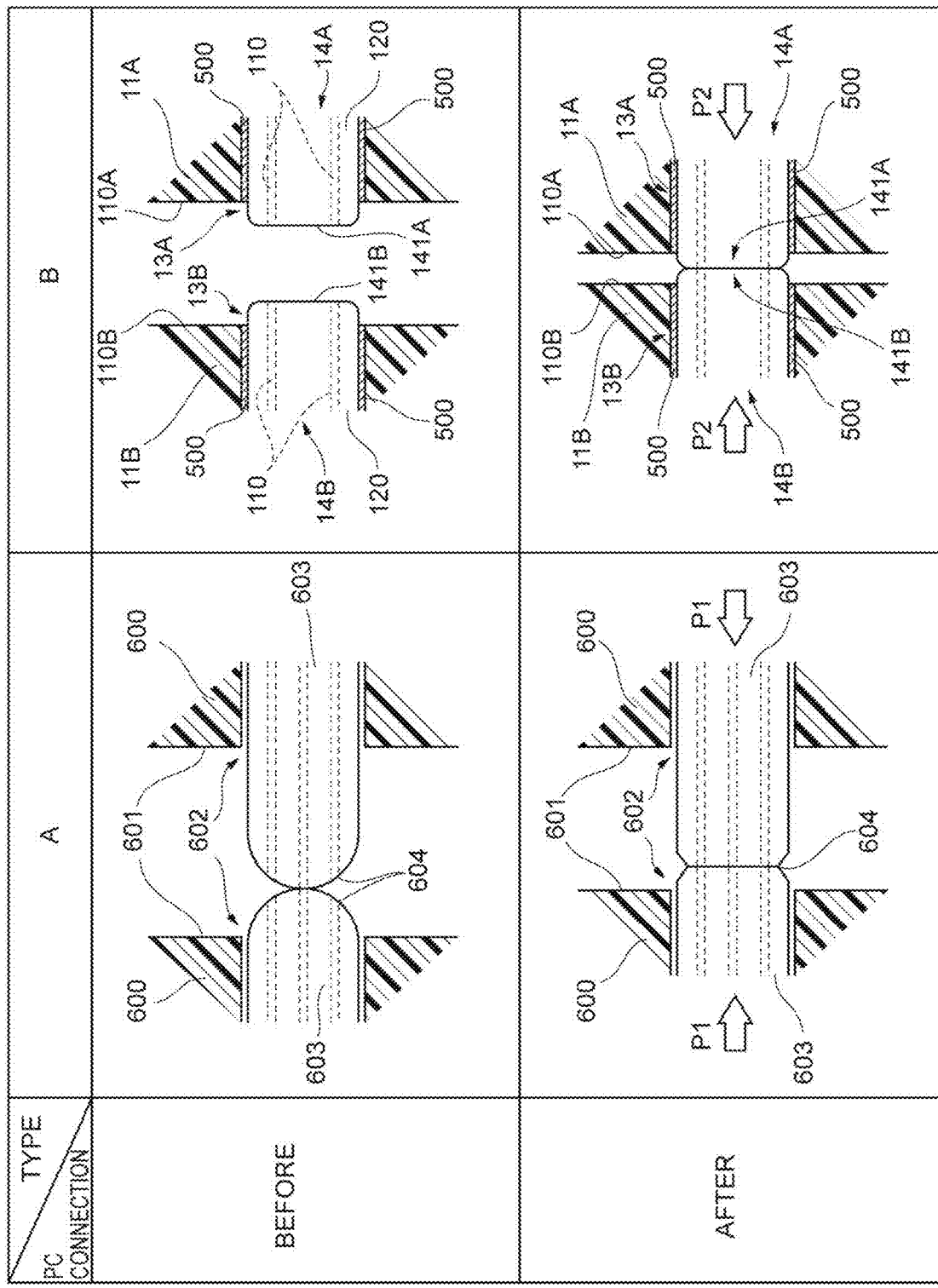
FIG. 5 is a diagram for describing PC connection in each of the first embodiment and the comparative example.

FIG. 5 illustrates PC connection using the MT ferrule 600 of the type A in FIG. 4 as a type A (comparative example) and PC connection using the MT ferrule 11A of the type B in FIG. 4 and the MT ferrule 11B (the type A or the type B in FIG. 1) as a type B (first embodiment).

In PC connection of the type A according to the comparative example, two MT ferrules 600 are opposed to each other with a predetermined distance kept between the front end faces 601. Before the PC connection, the optical fiber 603 whose fiber end face 604 is protruded and polished is inserted in the ferrule hole 602 of each of the MT ferrules 600. In the PC connection, a pressing force P1 is applied to the optical fibers 603, and the fiber end faces 604 are elastically deformed. Accordingly, the cores of the optical fibers 603 opposed to each other are PC-connected.

On the other hand, in PC connection of the type B according to the present embodiment, two MT ferrules 11A, 11B are opposed to each other with a predetermined distance kept between the front end faces 110A, 110B. Before the PC connection, the optical fibers 14A, 14B whose fiber end faces 141A, 141B are polished so as to have the predetermined curvature R are inserted in the ferrule holes 13A, 13B of the MT ferrules 11A, 11B, respectively. At this time, the optical fibers 14A, 14B are fixed to the inner wall surfaces of the ferrule holes 13A, 13B of the MT ferrules 11A, 11B, respectively, with the adhesive 500. In the PC connection, a pressing force P2 (10 N or more, and preferably 20 N or more) is applied to the MT ferrules 11A, 11B to which the optical fibers 14A, 14B are fixed. When the pressing force P2 is applied, the distance between the front end faces 110A, 110B of the MT ferrules 11A, 11B is reduced, and the fiber end faces 141A, 141B of the optical fibers 14A, 14B which are fixed to the MT ferrules 11A, 11B, respectively, are elastically deformed. Accordingly, the cores of the optical fibers 14A, 14B opposed to each other are PC-connected.

Next, the relationship between the protrusion amount h and the curvature R in each of the optical fibers 14A, 14B in the present embodiment, in particular, the relationship between the variation amount Δh of the protrusion amount h and the curvature R will be described in detail with reference to FIGS. 6 to 8. In the following description, the "curvature" means the maximum curvature taking into consideration curvature fluctuations in the fiber end faces 141A, 141B. Further, FIGS. 6 and 7 illustrate the structure of only the MT ferrule 11B side illustrated in FIG. 1 for convenience of description.

Figure 6:
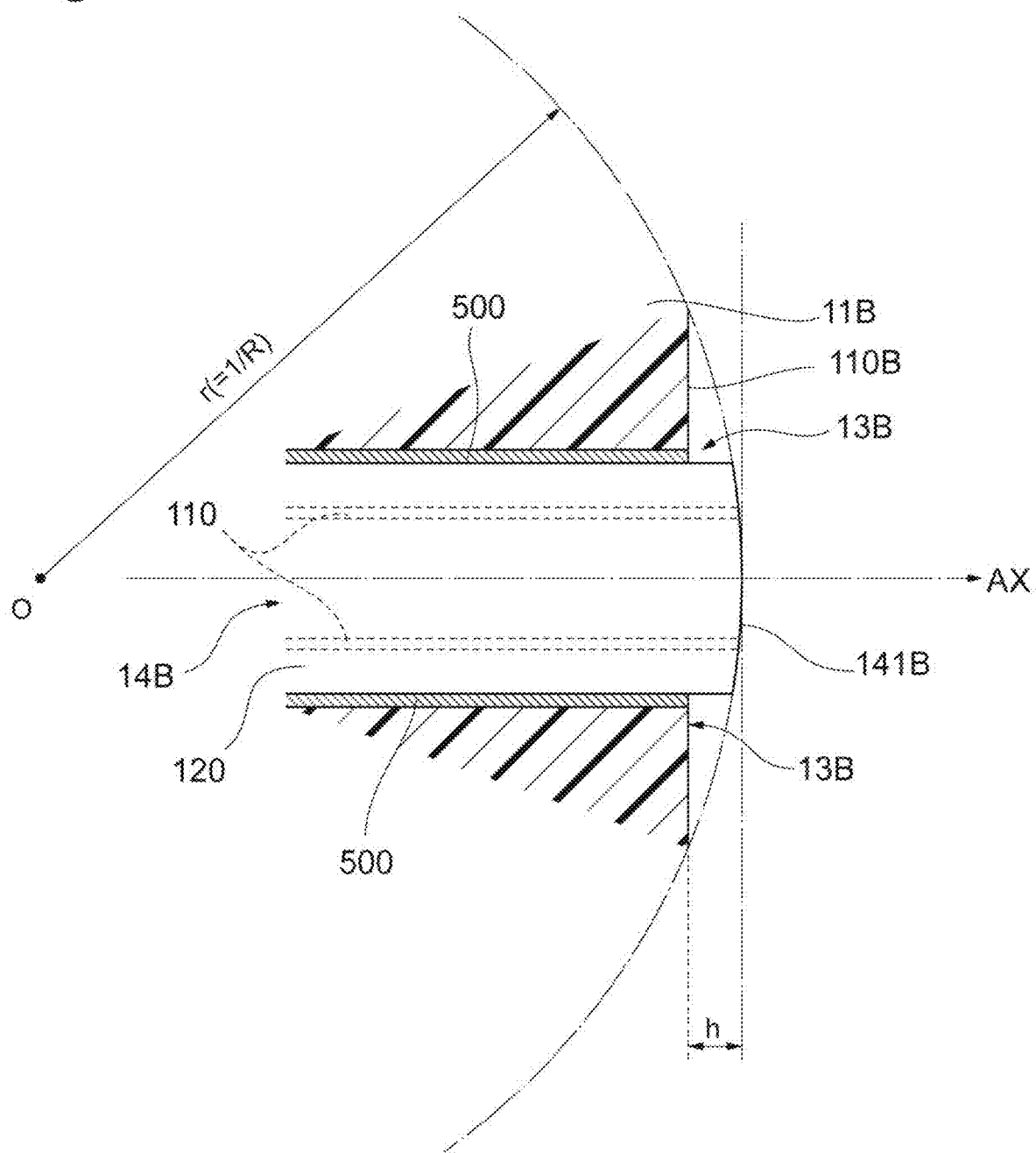
FIG. 6 is a diagram for describing the relationship between a curvature R of a fiber end face and a protrusion amount h in the MCF in the first embodiment.
Figure 7:
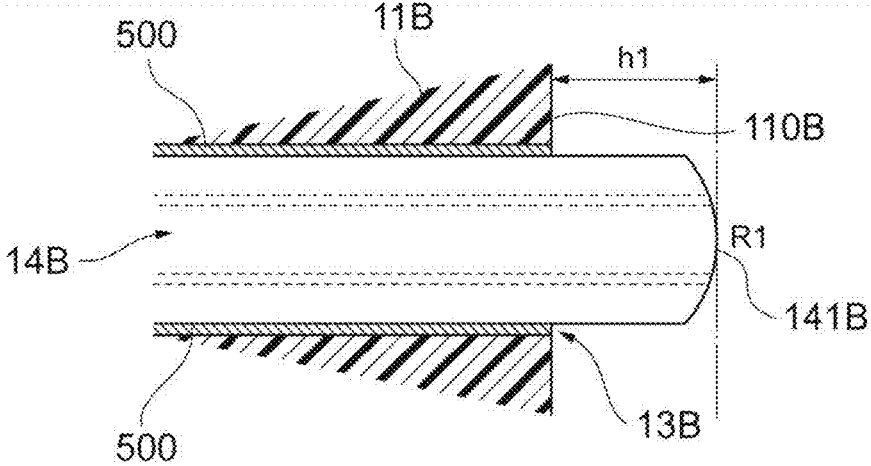
FIG. 7 is a diagram for describing a state of a fiber tip part of the MCF in the first embodiment.

As illustrated in FIG. 6, the tip part of the optical fiber 14B is fixed to the inner wall surface of the ferrule hole 13B of the MT ferrule 11B with the adhesive 500. The fiber end face 141B of the optical fiber 14B is polished so as to have the predetermined curvature R (the curvature radius r is the inverse of the curvature R). The curvature radius r illustrated in FIG. 6 is the radius of a circle that is approximate to the cross-sectional shape of the fiber end face 141B and has any central point O. The protrusion amount h of the fiber end face 141B of the optical fiber 14B from the front end face 110B of the MT ferrule 11B is defined by the distance from the front end face 110B to the fiber end face 141B along the central axis AX of the optical fiber 14B. That is, since the fiber end face 141B is set at the predetermined curvature R, the protrusion amount h substantially indicates the maximum distance from the front end face 110B to the fiber end face 141B. Further, the variation amount Δh of the protrusion amount h indicates the difference between a maximum protrusion amount $h_{max}$ and a minimum protrusion amount $h_{min}$ in the optical fibers 14B.

In the present embodiment, since the optical fiber 14B and the MT ferrule 11B are previously bonded and fixed to each other before PC connection, PC connection with a pressing force lower than a conventional pressing force is required.

Thus, there is a special trade-off relationship between the protrusion amount h and the curvature R described above. FIG. 7 is a diagram for qualitatively describing such a relationship between the protrusion amount h and the curvature R.

Specifically, when an appropriate protrusion amount of the optical fiber 14B is set at h1 for a predetermined pressing force, R1 is set as an appropriate curvature of the fiber end face 141B (type A). In order to enable PC connection with a smaller pressing force, the appropriate protrusion amount of the optical fiber 14B is set at h2 (<h1), and, at the same time, R2 (<R1) is set as the appropriate curvature of the fiber end face 141B (type B). In order to enable PC connection with a further smaller pressing force, the appropriate protrusion amount of the optical fiber 14B is set at h3 (<h2), and, at the same time, R3 (<R2) is set as the appropriate curvature of the fiber end face 141B (type C). Note that the curvature radius r (=1/R) increases in the order from the type A to the type C.

Figure 8:
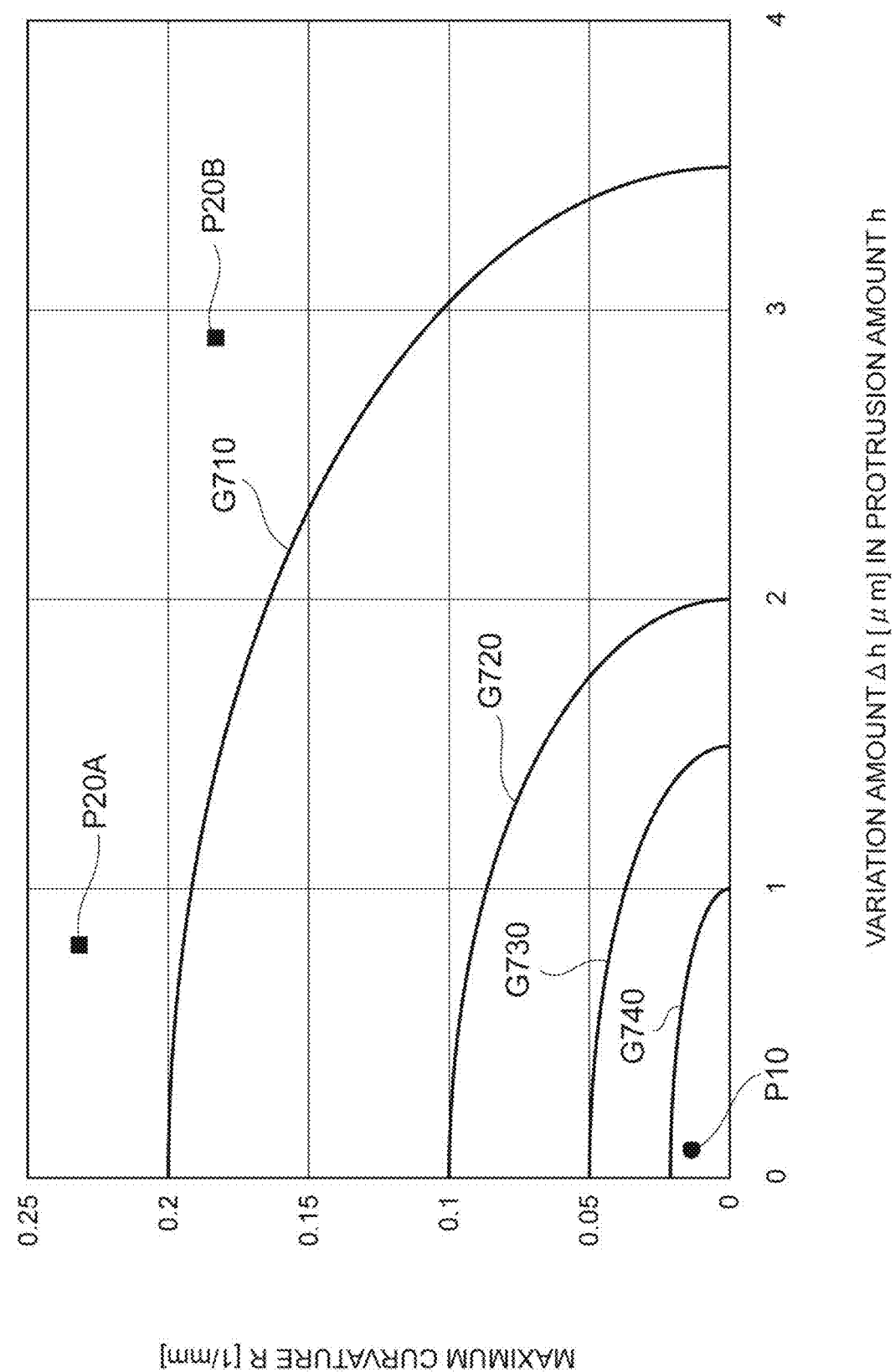
FIG. 8 is a graph illustrating the relationship between a variation amount Δh of the protrusion amount h (or a retraction amount d) and a maximum curvature R for each pressing force applied to the fiber end face of each of optical fibers which are PC-connected.

On the other hand, FIG. 8 is a graph for quantitatively describing the relationship between the variation amount Δh of the protrusion amount h and the curvature R. In the present embodiment, in order to reduce damage of the optical fiber, the optical fiber and the MT ferrule are previously bonded and fixed to each other before PC connection. Further, in order to enable PC connection with a smaller pressing force, a trade-off condition is defined.

Specifically, in FIG. 8, a graph G710 represents a critical condition $(\Delta h/3.5)^2+(R/0.2)^2=1$ that enables excellent many-to-many PC connection with a pressing force of 16 N. This condition is obtained from an empirical rule that, when many-to-many PC connection with a pressing force of 16 N or more is assumed, an allowable value of the variation amount Δh of the protrusion amount h of each of a plurality of optical fibers held by the MT ferrule is preferably 3.5 μm or less (for fiber damage), and an allowable value of the curvature (maximum curvature) R is preferably 0.2 or less. Thus, in the case of PC connection with a pressing force of at least 16 N, the variation amount Δh and the curvature R preferably satisfy the relationship of $(\Delta h/3.5)^2+(R/0.2)^2<1$.

Further, in FIG. 8, a graph G720 represents a critical condition $(\Delta h/2.0)^2 (R/0.1)^2=1$ that enables excellent many-to-many PC connection with a pressing force of 8 N. This condition is obtained from an empirical rule that, when many-to-many PC connection with a pressing force of 8 N or more is assumed, the allowable value of the variation amount Δh of the protrusion amount h is preferably 2.0 μm or less, and the allowable value of the curvature R is preferably 0.1 or less. Thus, in the case of PC connection with a pressing force of at least 8 N, the variation amount Δh and the curvature R preferably satisfy the relationship of $(\Delta h/2.0)^2+(R/0.1)^2<1$.

A graph G730 represents a critical condition $(\Delta h/1.5)^2+(R/0.05)^2=1$ that enables excellent many-to-many PC connection with a pressing force of 4 N. This condition is obtained from an empirical rule that, when many-to-many PC connection with a pressing force of 4 N or more is assumed, the allowable value of the variation amount Δh of the protrusion amount h is preferably 1.5 μm or less, and the allowable value of the curvature R is preferably 0.05 or less. Thus, in the case of PC connection with a pressing force of at least 4 N, the variation amount Δh and the curvature R preferably satisfy the relationship of $(\Delta h/1.5)^2+(R/0.05)^2<1$.

A graph G740 represents a critical condition $(\Delta h/1.0)^2+(R/0.02)^2=1$ that enables excellent many-to-many PC connection with a pressing force of 2 N. This condition is obtained from an empirical rule that, when many-to-many PC connection with a pressing force of 2 N or more is assumed, the allowable value of the variation amount Δh of the protrusion amount h is preferably 1.0 μm or less, and the allowable value of the curvature R is preferably 0.02 or less. Thus, in the case of PC connection with a pressing force of at least 2 N, the variation amount Δh and the curvature R preferably satisfy the relationship of $(\Delta h/1.0)^2+(R/0.02)^2<1$.

A point P10 plotted in FIG. 8 represents a set condition in which the variation amount Δh in the protrusion amount h is 0.1 μm, and the curvature R is 0.01/mm (the curvature radius r=100 mm) in the present embodiment. Further, a point P20A represents a set condition in which the variation amount Δh of the protrusion amount h (8.2 to 9.0 μm) is 0.8 μm, and the curvature R is 0.23/mm (the curvature calculated from the maximum difference Δ in the protrusion amount between cores at an interval of 50 μm) in Sample A (eight MCFs) illustrated in Non-Patent Document 1 described above. Further, a point P20B represents a set condition in which the variation amount Δh of the protrusion amount h (10.0 to 12.9 μm) is 2.9 μm, and the curvature R is 0.18/mm (the curvature calculated from the maximum difference Δ in the protrusion amount between cores at an interval of 50 μm) in Sample B (eight MCFs) illustrated in Non-Patent Document 1 described above.

Second Embodiment

An optical connector according to a second embodiment relates to the SC type connector 2 of the type C illustrated in FIG. 2. The optical connector according to the second embodiment includes the SC ferrules 21A, 21B illustrated in the type C and the type D in FIG. 2. In the second embodiment, the SC ferrules 21A, 21B are comprised of zirconia. The curvature radius r (the inverse of the curvature R) of the fiber end face of each of the optical fibers 14A, 14B is set at 10 mm or more, and preferably 25 mm or more. A retraction amount d from the front end faces 210A, 210B of the SC ferrules 21A, 21B to the fiber end faces 141A, 141B of the optical fibers 14A, 14B is set at −0.05 μm or more and +0.1 μm or less.

Figure 9:
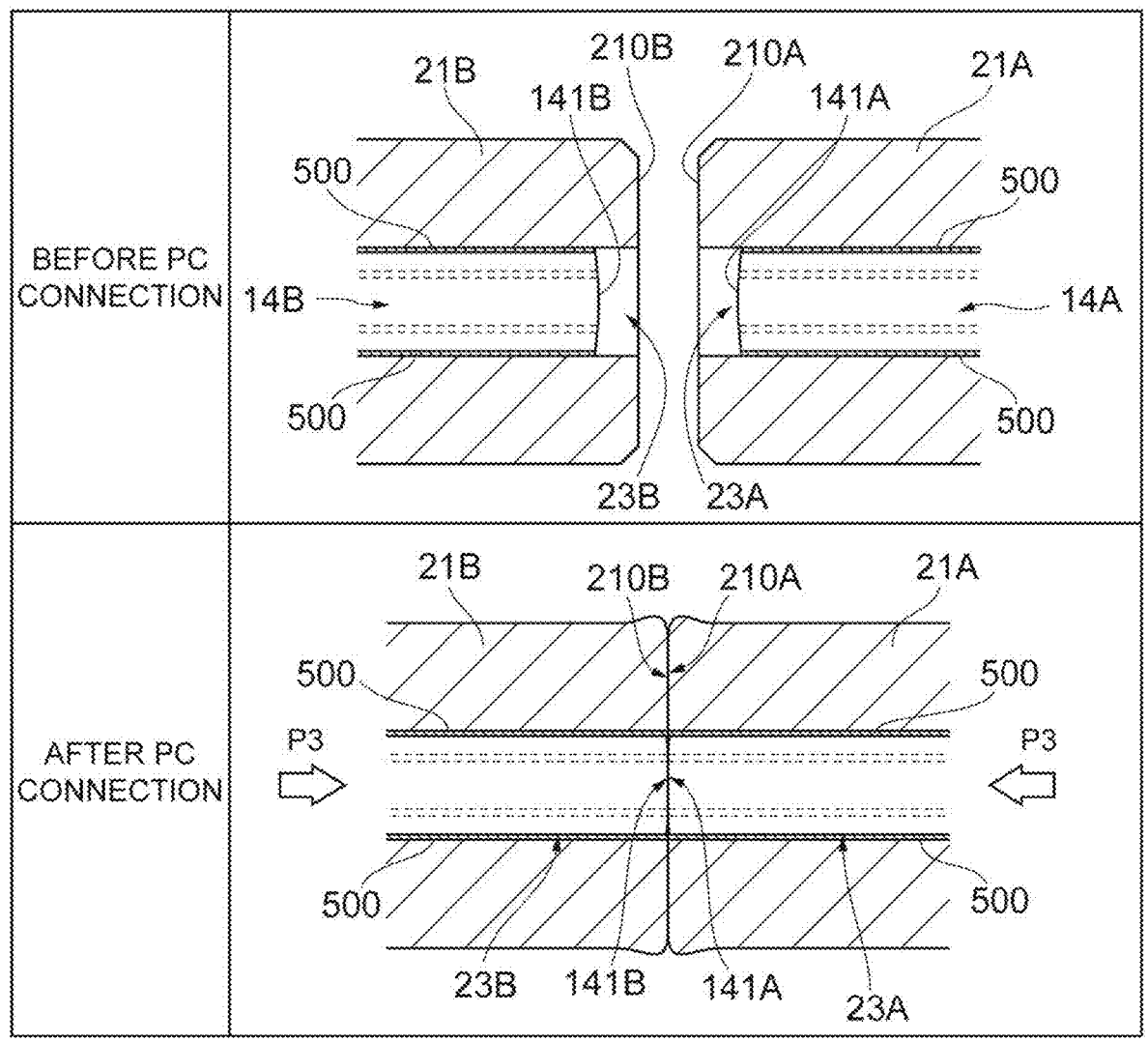
FIG. 9 is a diagram for describing PC connection in each of a second embodiment and a comparative example.

FIG. 9 is a diagram for describing PC connection in each of the second embodiment and a comparative example. Specifically, before the PC connection, the SC ferrules 21A, 21B are opposed to each other with a predetermined distance kept between the front end faces 210A, 210B. At this time, the optical fibers 14A, 14B whose fiber end faces 141A, 141B are polished so as to have the predetermined curvature R are inserted in the ferrule holes 23A, 23B of the SC ferrules 21A, 21B, respectively. The optical fibers 14A, 14B are fixed to the inner wall surfaces of the ferrule holes 23A, 23B of the SC ferrules 21A, 21B, respectively, with the adhesive 500. In the PC connection, a pressing force P3 (5 N or more, preferably 10 N or more, and more preferably 20 N or more) is applied to the SC ferrules 21A, 21B to which the optical fibers 14A, 14B are fixed. When the pressing force P3 is applied, the front end faces 210A, 210B of the SC ferrules 21A, 21B are deformed, and the fiber end faces 141A, 141B of the optical fibers 14A, 14B which are fixed to the SC ferrules 21A, 21B, respectively, are elastically deformed. Accordingly, the cores of the optical fibers 14A, 14B opposed to each other are PC-connected.

Figure 10:
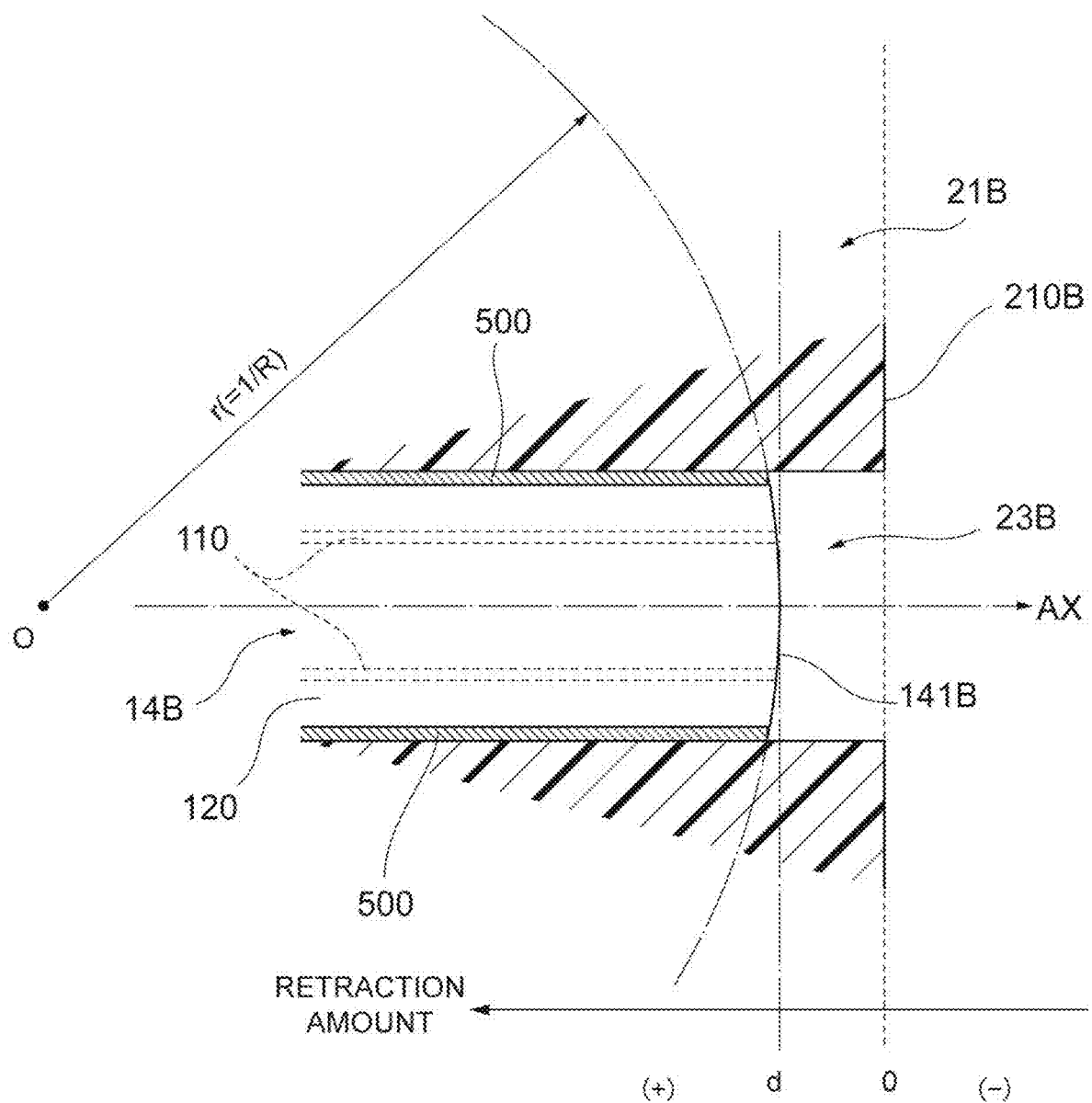
FIG. 10 is a diagram for describing the relationship between a curvature R of a fiber end face and a retraction amount d in an MCF in the second embodiment.

FIG. 10 is a diagram for describing the relationship between the curvature R of the fiber end face 141B and the retraction amount d in the optical fiber 14B (the optical fiber 14A is not illustrated) in the second embodiment. As illustrated in FIG. 10, the tip part of the optical fiber 14B is fixed to the inner wall surface of the ferrule hole 23B of the SC ferrule 21B with the adhesive 500. The fiber end face 141B of the optical fiber 14B is polished so as to have the predetermined curvature R (the curvature radius r is the inverse of the curvature R). The curvature radius r illustrated in FIG. 9 is the radius of a circle that is approximate to the cross-sectional shape of the fiber end face 141B and has any central point O. The retraction amount d of the fiber end face 141B of the optical fiber 14B from the front end face 210B of the SC ferrule 21B is defined by the distance from the front end face 210B to the fiber end face 141B along the central axis AX of the optical fiber 14B. That is, since the fiber end face 141B is set at the predetermined curvature R, the retraction amount d substantially indicates the maximum distance from the front end face 210B to the fiber end face 141B. Further, when the retraction amount d falls within a negative value range, the retraction amount d indicates that the fiber end face 141B is located outside the SC ferrule 21B (the fiber end face 141B protrudes from the front end face 210B).

As described above, the present embodiment is characterized by the structure in which the fiber end face is formed in a flat shape (the curvature of the fiber end face is reduced) to reduce the variation of the protrusion amount h of each of fibers. Such flattening of the fiber end face is effective in a case where each optical fiber that should be PC-connected is an MCF. An MCF includes cores present at a position other than the center of a cladding. Thus, when the center of the cladding protrudes in the front end face of the ferrule like a conventional shape, a large pressing force is required for contact between cores present at a position other than the center. In the present embodiment, since the curvature of the fiber end face is small (flat shape), PC connection between all cores can be performed with a pressing force smaller than a conventional pressing force. Further, the reduction in the protrusion amount reduces the variation of the protrusion amount of each of optical fibers held by one ferrule, enables excellent many-to-many PC connection for all the optical fibers, and effectively reduces the possibility of fiber damage.

REFERENCE SIGNS LIST

1 . . . MT connector (optical connector); 1' . . . MPO connector (optical connector); 2 . . . SC type connector (optical connector); 10A, 10B, 20A, 20B . . . plug; 10C, 20C . . . adapter; 11A, 11B . . . MT ferrule; 14A, 14B . . . optical fiber (MCF, SCF); 141A, 141B . . . fiber end face; 13A, 13B, 23A, 23B . . . ferrule hole; 15 . . . guide pin (guide structure); 16 . . . clip (press applying structure); 21A, 21B . . . SC ferrule; 110A, 110B, 210A, 210B . . . front end face; 140A, 140B, 240A, 240B . . . optical cable (tape fiber); 110 . . . core; 112A, 112B . . . engagement groove (press applying structure); 120 . . . cladding; 201A, 201B . . . guide groove (guide structure); 220A, 220B . . . guide piece (guide structure); 121B, 221A, 221B . . . engagement pin (press applying structure); 202A, 202B . . . engagement port (press applying structure); and 500 . . . adhesive (epoxy resin).

The invention claimed is:

1. An optical connector comprising:
a plurality of first optical fibers; and
a first ferrule including one end face and a plurality of through holes each having an opening on the one end face, the first ferrule holding a part of a tip part of each of the first optical fibers by a corresponding one of the through holes with end faces of the first optical fibers protruding from the one end face, wherein
a maximum curvature R [1/mm] of the end face of each of the first optical fibers and a variation amount $\Delta h$ [μm] of a protrusion amount h of each of the first optical fibers protruding from the one end face of the first ferrule satisfy a relationship of $(\Delta h/3.5)^2+(R/0.2)^2<1$, the protrusion amount h defined along a central axis of each of the first optical fibers,
each of the first optical fibers includes a multicore optical fiber having a plurality of cores and a single cladding surrounding each of the cores, and
in a cross section of the multicore optical fiber, the cores are disposed surrounding a center of the cross section in a state in which a shortest distance from the center of the cross section to a center of each of the cores is 5 μm or more, the cross section being perpendicular to a longitudinal direction of the multicore optical fiber.

2. The optical connector according to claim 1, wherein a side face of the tip part of each of the first optical fibers and an inner wall surface of the corresponding one of the through holes of the first ferrule are bonded and fixed to each other.

3. The optical connector according to claim 1, wherein a maximum curvature radius r (=1/R) of the end face of each of the first optical fibers is 25 mm or more, and the protrusion amount h falls within a range of 0 μm to 3.5 μm.

4. The optical connector according to claim 1, wherein the variation amount $\Delta h$ of the protrusion amount of each of the first optical fibers is 0.1 μm or less.

5. The optical connector according to claim 1, wherein the first ferrule includes a pair of guide holes disposed with the through holes interposed therebetween, and
the optical connector further comprises:
a plurality of second optical fibers each having the same structure as the first optical fibers;
a second ferrule having the same structure as the first ferrule, the second ferrule holding a tip part including an end face of each of the second optical fibers;
a pair of guide pins each having one end inserted into a corresponding one of the guide holes of the first ferrule and the other end inserted into a corresponding one of the guide holes of the second ferrule; and
a press applying structure for butting the end faces of the first optical fibers and end faces of the respective second optical fibers against each other while applying a pressing force of 10 N or more with the first ferrule and the second ferrule opposed to each other through the pair of guide pins.

* * * * *